United States Patent [19]

Arai et al.

[11] Patent Number: 5,713,504
[45] Date of Patent: Feb. 3, 1998

[54] TRANSPORT APPARATUS FOR AUXILIARY SCANNING

[75] Inventors: Haruhiko Arai, Kanagawa; Noboru Seto, Minami-ashigara, both of Japan

[73] Assignee: Fuji Photo Film Co., Ltd., Kanagawa, Japan

[21] Appl. No.: 757,820

[22] Filed: Nov. 27, 1996

[30] Foreign Application Priority Data

Nov. 27, 1995 [JP] Japan .................. 7-307214

[51] Int. Cl.⁶ .................................. B65H 20/00
[52] U.S. Cl. ........................... 226/183; 226/187
[58] Field of Search .................. 226/183, 187, 226/198

[56] References Cited

U.S. PATENT DOCUMENTS

| | | | |
|---|---|---|---|
| 1,981,411 | 11/1934 | Fritz | 226/183 X |
| 3,107,036 | 10/1963 | Richards et al. | 226/198 |
| 5,617,986 | 4/1997 | Kawamura | 226/183 X |

FOREIGN PATENT DOCUMENTS 574916  12/1993  European Pat. Off. ........... 226/183

*Primary Examiner*—Michael Mansen

[57] ABSTRACT

Improved transport apparatus for auxiliary scanning, which is to be used with an image recording system in which exposing light sources issuing optical beams to be deflected in the main scanning direction are used to scan and expose a web of light-sensitive material has an exposure drum that transports the web of light-sensitive material in a auxiliary scanning direction which is substantially perpendicular to the main scanning direction as it is held in a predetermined exposing position, as well as a first and a second nip roller that are spaced apart in the auxiliary scanning direction, with the exposing position lying in between, and which urge the web of light-sensitive material against the exposure drum, the first nip roller being located upstream the auxiliary scanning direction and provided with a uniform predetermined nip pressure at both end portions, and the second nip roller being located downstream the auxiliary scanning direction and provided at opposite end portions with nip pressures within a predetermined range that will create a predetermined differential nip pressure between the opposite end portions. The apparatus realizes consistent transport of the light-sensitive material to enable the recording of high-quality images free from instrumental variability.

2 Claims, 4 Drawing Sheets

TRANSPORT APPARATUS FOR AUXILIARY SCANNING

BACKGROUND OF THE INVENTION

This invention relates to an apparatus for transporting a web of light-sensitive material in an auxiliary scanning direction substantially perpendicular to a main scanning direction. The apparatus is intended for use with image recording systems such as printers, copiers and printing platemaking machines in which exposing light sources issuing optical beams to be deflected in the main scanning direction are used to scan and expose a web of light-sensitive material as it is transported in the auxiliary scanning direction.

Consider, for example, an image recording apparatus that performs exposure by raster scan. Exposing light sources for three primary colors such as cyan (C), magenta (M) and yellow (Y) emit respective optical beams, which are shaped to parallel beams by means of associated collimator lenses and incident on an optical deflector such as a polygonal mirror to be deflected in the main scanning direction; the deflected beams pass through an fθ lens to be incident on a light-sensitive material after being adjusted such that they form focused images of predetermined shapes in predetermined positions.

The light-sensitive material in a web form is transported by transport means including one for transporting it in the auxiliary scanning direction. The light-sensitive material is first drawn out of a magazine containing it in a roll form and transported by the associated transport means at a predetermined speed in the auxiliary scanning direction which is substantially perpendicular to the main scanning direction. Therefore, the web of light-sensitive material which has been transported in the auxiliary scanning direction to the image recording position is subjected to exposure by two-dimensional scanning with the optical beams from the exposing light sources C, M and Y which are being deflected in the main scanning direction to record latent images on the entire surface of the light-sensitive material.

The transport means described above is essentially composed of roller pairs which transport the light-sensitive material as it is held between individual rollers. A transport guide comprising a pair of identical members to regulate the end portions of the web of light-sensitive material in the direction of its width is generally provided between adjacent transport means in order to ensure smooth transport of the light-sensitive material. The transport guide helps reduce the chance of the web of meandering or skewing during its continuous transport to thereby offer the advantage of producing high-quality recorded images that are free from distortion and other defects.

In image recording system of a type that perform exposure of a web of light-sensitive material by scanning with optical beams such as laser beams, uneven transport can be caused by transport means and, even if transport guides are employed, slight meandering or skewing may occur and these phenomena will produce significantly uneven exposure or extensive distortions in the recorded image; it is therefore necessary to ensure that uneven transport, meandering, skewing and other troubles with the light-sensitive material are reduced to the smallest possible degrees. To this end, it is of course necessary to precisely control the operation of the transport means, particularly, the one for transport in the auxiliary scanning direction; what is more, the image recording position of the light-sensitive material has to be strictly regulated by transport guides, particularly the one that is provided just before the exposing section.

An apparatus is available for transporting the light-sensitive material in the auxiliary scanning direction in such a way that said material being held between an exposure drum and each of two nip rollers is regulated to register with a predetermined exposing position. In this apparatus, the nip rollers are urged against the exposure drum by suitable means such as springs. The spring constants of springs are prone to errors, so even if a uniform nip pressure is applied to both end portions of each nip roller, a difference in nip pressure will inevitably occur between the opposed end portions of either nip roller, producing a certain amount of unevenness in the transport of the light-sensitive material. During transport of the light-sensitive material, the distance between two identical members of a transport guide is adjusted in accordance with the width of the light-sensitive material. Since an unduly small distance between the two members of the transport guide can sometimes cause jamming, they are usually adjusted to have a certain allowance compared to the width of the light-sensitive material. Therefore, mere adjustment of the distance between the two members of the transport guide in accordance with the width of the light-sensitive material is by no means sufficient to avoid the problem that the slight clearance between each end of the light-sensitive material in the direction of width and the opposite member of the transport guide will necessarily cause the light-sensitive material to meander or skew by a certain amount.

Thus, the conventional transport apparatus for auxiliary scanning has had two major problems: first, the difference between the spring constants of springs that urge the nip rollers against the exposure drum introduces difficulty in transporting the light-sensitive material in a consistent manner; second, a transport guide comprising two identical members has a small clearance between either end of the light-sensitive material and the opposed member to said end and because of this clearance, the light-sensitive material will necessarily meander or skew to some extent. Therefore, image recording systems employing the conventional transport apparatus for auxiliary scanning have had the problem that it is difficult to produce recorded images of high quality that are free from defects such as uneven exposure, distortions and instrumental variability.

SUMMARY OF THE INVENTION

The prevent invention has been accomplished under these circumstances and has as an object providing a transport apparatus for auxiliary scanning that introduces a predetermined differential nip pressure between opposite end portions of one of two nip rollers such that a web of light-sensitive material is constantly biased toward either one of two identical members of a transport guide, whereby the meandering, skewing and uneven transport of the light-sensitive material are minimized to realize consistent transport of the light-sensitive material so as to produce recorded images of high quality that are free from instrumental variability.

In order to attain the object described above, the present invention provides a transport apparatus for auxiliary scanning which is to be used with an image recording system in which exposing light sources issuing optical beams to be deflected in a main scanning direction are used to scan and expose a web of light-sensitive material. The apparatus has an exposure drum that transports the web of light-sensitive material in a auxiliary scanning direction which is substantially perpendicular to the main scanning direction as it is held in a predetermined exposing position, as well as a first and a second nip roller that are spaced apart in the auxiliary scanning direction, with the exposing position lying in between, and which urge the web of light-sensitive material against the exposure drum, the first nip roller being located upstream the auxiliary scanning direction and provided with a uniform predetermined nip pressure at both end portions, and the second nip roller being located downstream the auxiliary scanning direction and provided at opposite end portions with nip pressures within a predetermined range that will create a predetermined differential nip pressure between the opposite end portions.

Preferably, the nip pressure applied to both end portions of the first nip roller is no more than 200 gf of linear pressure whereas the differential nip pressure created between opposite end portions of the second nip roller is at least 300 gf of linear pressure and the nip pressures applied to the second nip pressure are within the range from 500 gf to 2,000 gf of linear pressure.

DETAILED DESCRIPTION OF THE INVENTION

The transport apparatus of the invention for performing auxiliary scanning will now be described in greater detail below.

The invention assumes the use of two nip rollers that are urged against an exposure drum. The first nip roller will serve as a guide roller to prevent the lifting of a light-sensitive material and it is provided at both end portions with a uniform, comparatively low nip pressure, preferably a linear pressure (along the contact line) of no greater than 200 gf. The second nip roller will serve as a transport roller that causes the light-sensitive material to be biased toward one side when it is transported between the exposure drum and said second nip roller and it is provided at two end portions with comparatively high nip pressures, preferably linear pressures of from 500 gf to 2,000 gf, that will produce a differential nip pressure, preferably a difference of at least 300 gf, between the end portions.

In the invention transport apparatus for auxiliary scanning, the second nip roller is provided at two end portions with nip pressures within a predetermined range that will produce a predetermined differential nip pressure and, as a result, the light-sensitive material will be biased toward the side having the higher nip pressure to thereby ensure that the light-sensitive material is transported in a steady-state and consistent manner running along only one of two identical members of a transport guide that are provided in two opposite end portions of the light-sensitive material in the direction of width.

Thus, according to the present invention, the first nip roller prevents the lifting of the light-sensitive material whereas the second nip roller permits the light-sensitive material to be transported in a steady-state and consistent manner, whereby troubles such as the meandering, skewing and uneven transport of the light-sensitive material can be minimized to ensure the recording of high-quality images free from instrumental variability.

On the pages that follow, the transport apparatus of the invention for auxiliary scanning is described in detail with reference to the preferred examples shown in accompanying drawings. We will first describe an image recording system employing the transport apparatus of the invention for auxiliary scanning.

Figure 1:
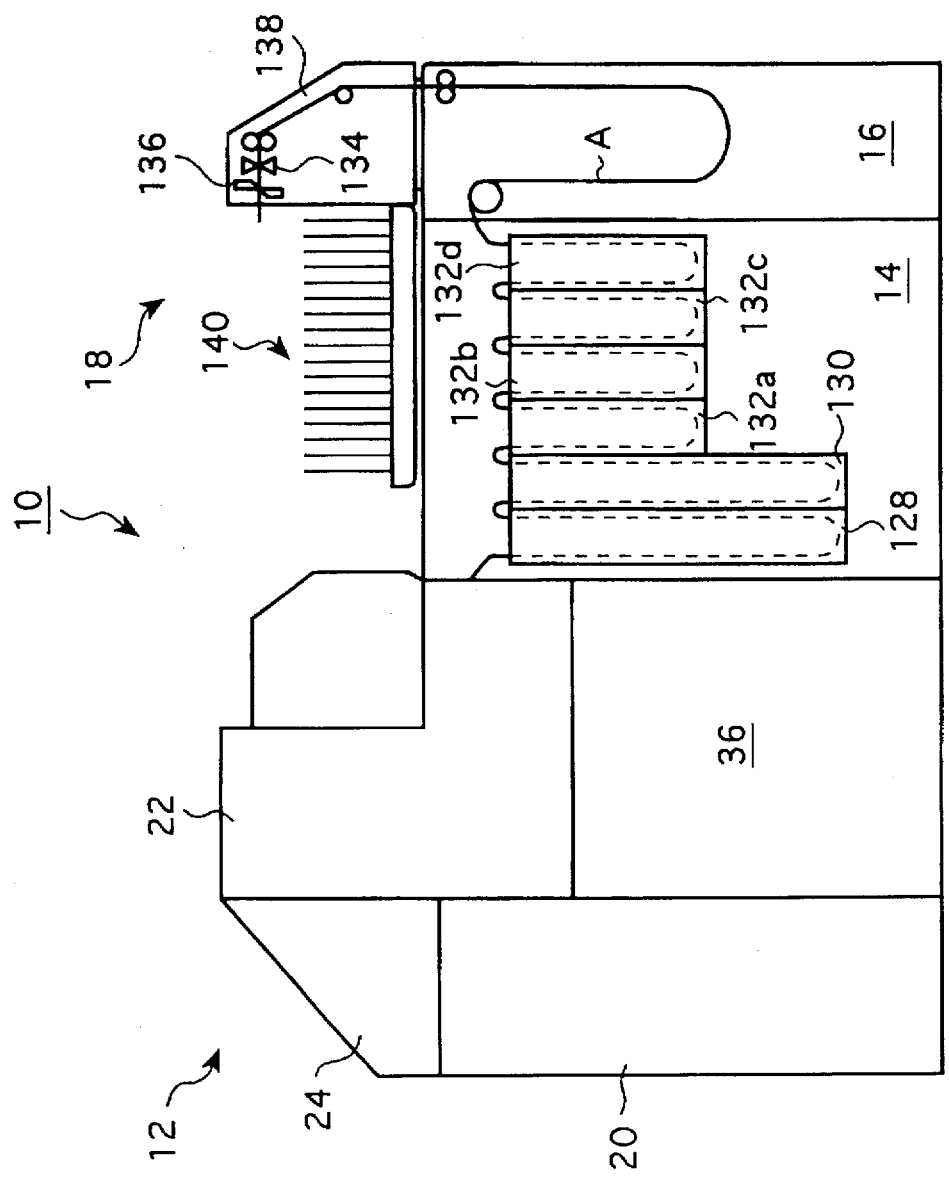
FIG. 1 shows schematically an exemplary image recording system employing the invention transport apparatus for auxiliary scanning.

FIG. 1 shows schematically an exemplary image recording system that employs the invention transport apparatus for auxiliary scanning. The image recording system generally indicated by 10 is a digital photoprinter which, in response to the image picked up with an image reader such as a film scanner, performs exposure of a light-sensitive material A to form latent images by scanning with optical beams under the exposing conditions (i.e., the conditions for image recording) that have been determined with a setup device, then performs development and other processing, and outputs prints having the film image recorded thereon.

As shown, the image recording system 10 has an image recording unit 12, a developing unit 14, a drying unit 16, an ejecting unit 18 and an electrical unit as basic parts.

The image recording unit 12 is composed of a print/transport apparatus 22 and an optical beam scanner 24.

Figure 2:
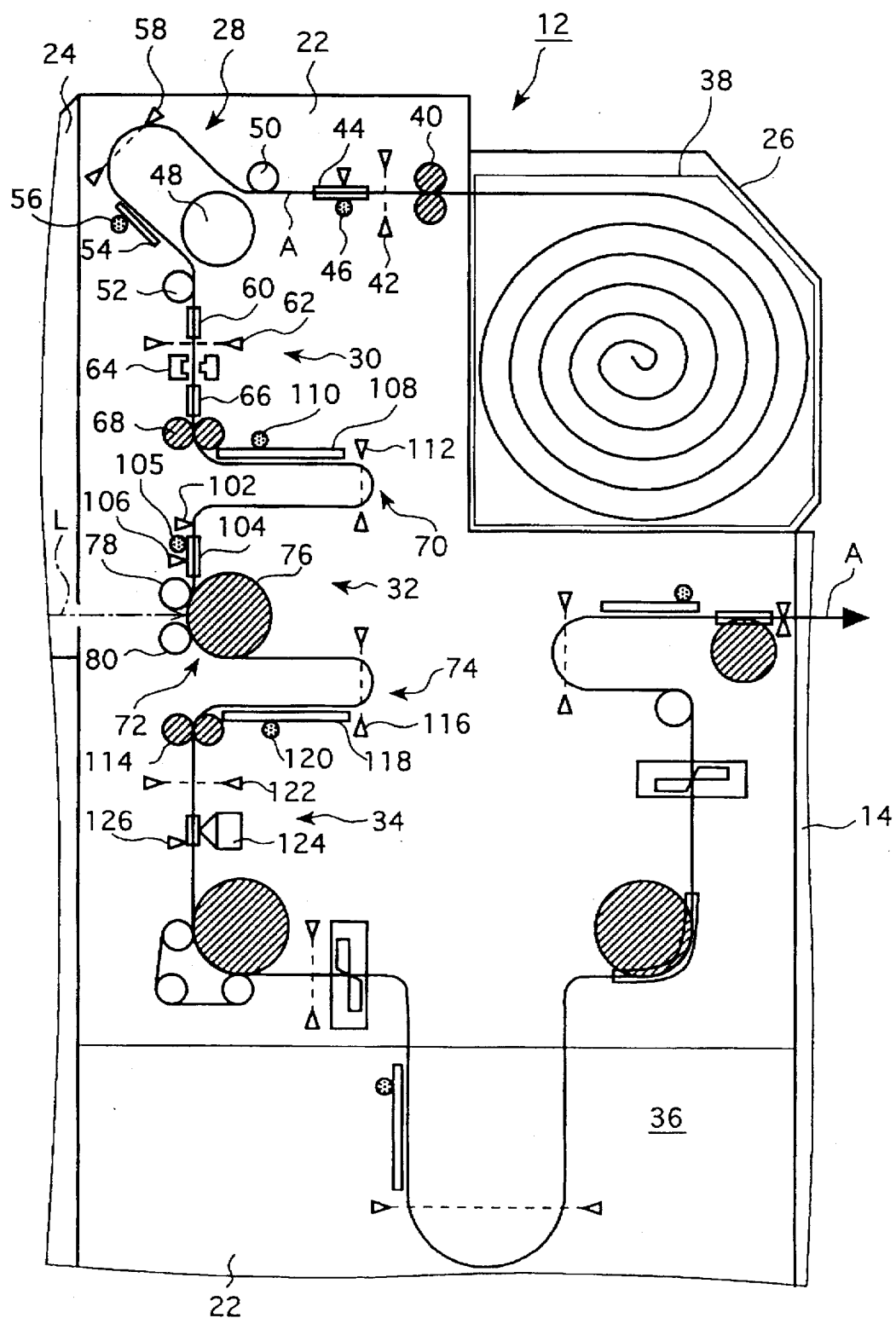
FIG. 2 shows schematically an example of the print/transport apparatus in the image recording system shown in FIG. 1.

FIG. 2 shows schematically the print/transport apparatus 22. In the print/transport apparatus 22, the light-sensitive material A is unwound from a roll and transported in a predetermined path as various processes are performed such as the recording of image position information, imagewise exposure (printing) and back printing before it is transported to developing unit 14 in the subsequent stage. As shown, the print/transport apparatus 22 has a light-sensitive material supply section 26, a first loop forming section 28, an image position information constructing section 30, an exposing section 32, a back printing section 34, a reservoir 36 and transport means for transporting the light-sensitive material A in a predetermined path that threads through these sections.

The light-sensitive material supply section 26 is an area that is loaded with a magazine 38 having a web of light-sensitive material A wound in a roll form that is contained in a light-shielding enclosure.

Positioned downstream of the light-sensitive material supply section 26 (in the direction of transport of the light-sensitive material) are a drawing roller pair 40 which transports the light-sensitive material A as it is drawn out of the magazine 38, a sensor 42 for detecting the light-sensitive material A, a transport guide 44 comprising two identical members provided at opposite ends of the light-sensitive material A in the direction of width, and a motor 46 for driving the transport guide 44. The drawing roller pair 40 is transport means which draws the light-sensitive material A out of the magazine 38 loaded in the light-sensitive material supply section 26 and transports it to the first loop forming section 28.

The first loop forming section 28 is provided downstream of the transport guide 44 and it forms a loop of the light-sensitive material A to thereby ensure smooth stop of the light-sensitive material A being transported by a transport roller pair 68 in the image position information constructing section 30 (to be described later) while absorbing the tension created by the transport roller pair 68. The first loop forming section 28 has a drive roller 48 for transporting the light-sensitive material A, guide rollers 50 and 52, a transport guide 54 for guiding the light-sensitive material A, a motor 56 for driving the transport guide 54, and a sensor 58 for detecting the formation of a loop of the light-sensitive material A.

In the usual operation of the image recording system 10, the light-sensitive material A in a web form is subjected to continuous image recording and developing processes and the processed web is eventually cut into "finished" prints. Therefore, in order to start the exposure of the light-sensitive material A at a specified position or to cut it in a specified position or for the purpose of back printing which is required by a certain system configuration (as in the illustrated case), there is constructed image position information such as position information for an individual print (so-called "frame information") or position information for an appropriately set unit number of prints (so-called "sort information") which may correspond to one film.

Such frame information, sort information and other types of image position information are constructed by the image position information constructing section 30 which is provided downstream of the first loop forming section 28 and comprises, in order from the upstream to the downstream side, a transport guide 60 for guiding the light-sensitive material A, a sensor 62 for detecting the papering of the light-sensitive material A, a punch 64 for perforating the light-sensitive material A, a transport guide 66, and a transport roller pair 68. To construct the image position information, holes of a given shape, say, square, may be made with the punch 64 at the advancing end of the light-sensitive material A in a position that corresponds to a single print (one frame) or the unit number of prints to be sorted.

The exposing section 32 is provided downstream of the image position information constructing section 30 and, in the illustrated image recording system 10, the exposing section 32 combines with the optical beam scanner 24 to make up exposing means which performs digital exposure of the light-sensitive material by two-dimensional scanning with optical beams. The essential parts of the exposing section 32 are a second loop forming portion 70, a transport mechanism for auxiliary scanning 72 and a third loop forming portion 74.

Figure 3:
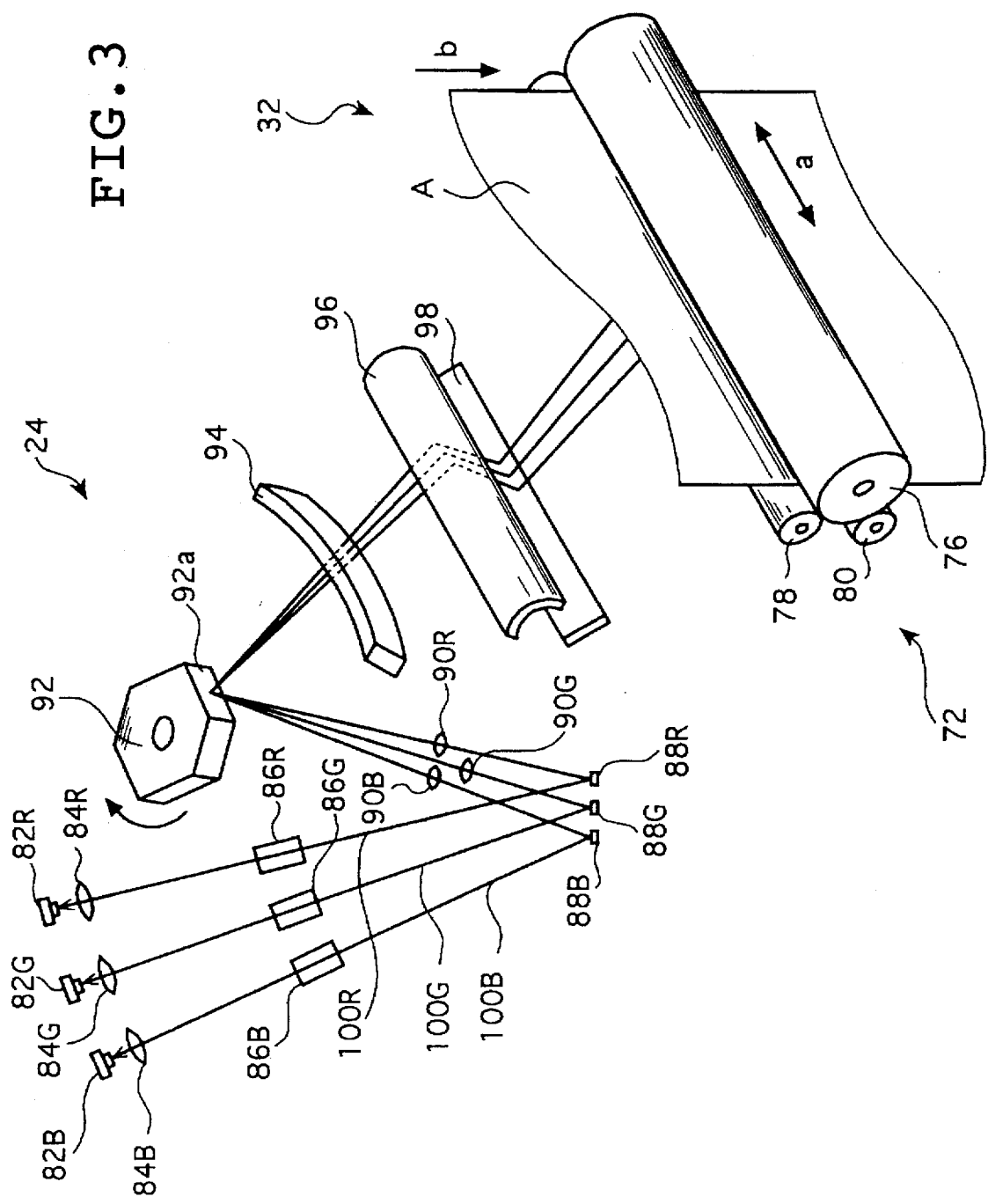
FIG. 3 shows schematically an example of the apparatus for performing exposure by scanning with optical beams as well as the transport mechanism for auxiliary scanning that are employed in the image recording system shown in FIG. 1.

FIG. 3 shows schematically the imagewise exposing means which comprises the optical beam scanner 24 and the transport mechanism 72 for auxiliary scanning which is a component of the exposing section 32.

The optical beam scanner 24 is first described. It makes optics for allowing three laser beams to be incident at different angles (i.e., tri-beam noncombining optics), by which the light-sensitive material A having wavelength-dependent spectral sensitivities, in particular, a normal color light-sensitive material having spectral sensitivity peaks for three primary colors within the visible range, is exposed through scanning with optical beams of the three primary colors. As shown, the optical beam scanner 24 has a semiconductor laser (LD) 82R which issues an optical beam for exposure to red (R), a wavelength transforming laser (G-SHG) 82G which employs a SHG (second harmonic generation) device issuing an optical beam for exposure to green (G), a wavelength transforming laser (B-SHG) 82B which employs a SHG device issuing an optical beam for exposure to blue (B), which are combined with the following components arranged in order along the path of travel of the optical beams issued from the laser light sources 82R, 82G and 82B: collimator lenses 84R, 84G and 84B, AOM (acoustooptical modulators) 86R, 86G and 86B, reflector mirrors 88R, 88G and 88B, cylindrical lenses 90R, 90G and 90B, a polygonal mirror 92, an fθ lens 94, a cylindrical mirror 96, and a reflector mirror 98.

The tri-beam non-combining optics has three laser light sources 82R, 82G and 82B that emit beams of light at specified narrow-band wavelengths and which are incident on a reflecting face 92a of the polygonal mirror 92 at slightly varying angles (say, about 4 degrees). In the case shown in FIG. 3, the LD 82R for exposure to red emits light at a wavelength of 680 nm, the G-SHG 82G for exposure to green emits light at a wavelength of 532 nm, and the B-SHG 82B for exposure to blue emits light at a wavelength of 473 nm.

The collimator lenses 84R, 84G and 84B shape the laser beams 100R, 100G and 100B from the laser light sources 82R, 82G and 82B, respectively, such that they are rendered parallel beams. The AOM (acoustooptical modulators) 86R, 86G and 86B modulate the laser beams 100R, 100G and 100B, respectively, in accordance with image data signals for the associated colors which have been subjected to image processing with an image processor (not shown).

Each of the cylindrical lenses 90R, 90G and 90B combines with the fθ lens 94 and the cylindrical mirror 96 to make up optics for correcting the tilting of the polygonal mirror 92. The laser light sources 82R, 82G and 82B are arranged in such a way that the laser beams 100R, 100G and 100B they issue are incident on the reflecting face 92a of the polygonal mirror 92 at slightly varying angles and the reflected beams are focused to form images at different angles in the same main scanning line on the light-sensitive material A to thereby scan over the same main scanning line at timed intervals. The reflector mirrors 88R, 88G and 88B will fold back the optical paths of the laser beams 100R, 100G and 100B such that they are incident on the reflecting face 92a of the polygonal mirror 92 either at the same point or in proximate positions on the same line.

The fθ lens 94 ensures that each of the laser beams 100R, 100G and 100B will be correctly focused in any of the positions on the main scanning line. The lens is such that chromatic aberration is corrected to fall within tolerable limits irrespective of whether the incident light has a wavelength of 473 nm, 532 nm or 680 nm. The cylindrical mirror 96 combines with the cylindrical lenses 90R, 90G and 90B to make up the tilt correcting optics; the other function of the cylindrical mirror bends the respective laser beams 100R, 100G and 100B to be incident on the reflector mirror 98 which rebends the laser beams 100R, 100G and 100B to be directed toward the main scanning line which is on the light-sensitive material A being transported by transport mechanism 72 for auxiliary scanning and which is generally perpendicular to the auxiliary scanning direction. The transport mechanism 72 for auxiliary scanning has the following components: an exposure drum 76 which transports the light-sensitive material A in the auxiliary scanning direction (indicated by arrow b in FIG. 3) which is generally perpendicular to the main scanning direction as said light-sensitive material is held in a predetermined exposing position; two nip rollers 78 and 80 that are spaced apart in the auxiliary scanning direction, with the exposing position (scanning line) lying in between, and which are urged against the exposure drum 76 with the light-sensitive material A being interposed; a sensor 102 for detecting the above-mentioned frame information to thereby detect the image recording position; a transport guide 104; a motor 105 for driving the transport guide 104; and a sensor 106 for detecting the advancing end of the light-sensitive material A.

The light-sensitive material A is transported in the auxiliary scanning direction as follows by the combination of the exposure drum 76 and nip rollers 78 and 80. If the frame information is detected with the sensor 102 shown in the print/transport apparatus 22 in FIG. 2 and when the light-sensitive material A is transported until the RECORD START position coincides with the exposing position, the optical beam scanner 24 is driven to start the exposure of the light-sensitive material A by scanning with three optical beams L. The optical beams L are deflected in the main scanning direction whereas the light-sensitive material A is transported in the auxiliary scanning direction which is perpendicular to the main scanning direction; as a result, the light-sensitive material A is exposed by two-dimensional scanning with the optical beams L to record latent images.

Figure 4A:
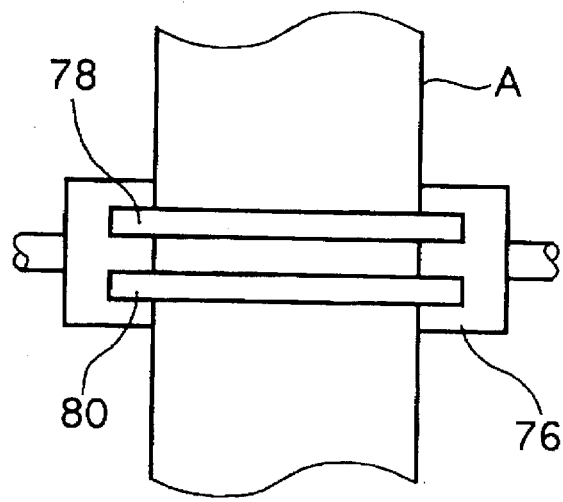
FIG. 4a is a plan view showing schematically an exemplary combination of an exposure drum and two nip rollers that are constituent elements of the invention transport apparatus for auxiliary scanning.
Figure 4B:
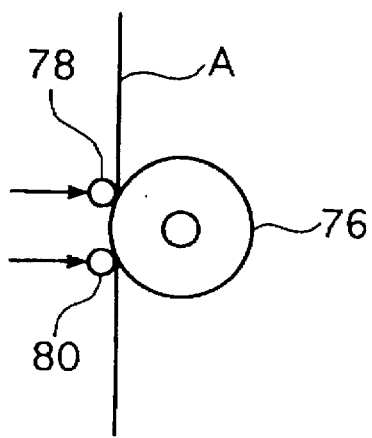
FIG. 4b is a schematic cross section of the same combination.

FIGS. 4a and 4b are a plan view and a cross sectional view showing conceptually an exemplary combination of the exposure drum and two nip rollers that are constituent elements of the invention transport apparatus for auxiliary scanning, respectively. After the papering of the light-sensitive material A, the two nip rollers 78 and 80 urge it against the exposure drum 76 at a predetermined nip pressure as shown in these Figures.

The nip roller 78 is practically ineffective in transporting the light-sensitive material A as it is held between said nip roller 78 and the exposure drum 76 but it serves as a guide roller that prevents the lifting of the light-sensitive material A. Hence, the nip roller 78 is provided at both end portions with a uniform and comparatively low nip pressure, preferably a linear pressure (along the contact line) of no more than 200 gf that is sufficient to prevent the lifting of the light-sensitive material A.

The nip roller 80 is a transport roller for transporting the light-sensitive material A as it is held between said nip roller 80 and the exposure drum 76 and biased toward one side. Hence, the nip roller 80 is provided at opposite end portions with comparatively high nip pressures within a predetermined range, preferably linear pressures (along the contact line) of from 500 gf to 2,000 gf sufficient to transport the light-sensitive material A as it is held between said nip roller 80 and the exposure drum 76, such that a predetermined differential nip pressure, preferably a linear pressure (along the contact line) of at least 300 gf sufficient to permit the light-sensitive material A to be biased toward only one of the two identical members of the transport guide 104.

If not only the nip roller 80 but also the nip roller 78 is provided at the opposite end portions with comparatively high nip pressures that will create a predetermined differential nip pressure between said opposite end portions, the traveling speed of the light-sensitive material A will become different between the two end portions in the direction of width and either end portion of the light-sensitive material A will be lifted at the exposing position. In addition, sufficient stress relaxation will develop to eliminate the lift of the light-sensitive material A, which as a result will slip or experience other troubles to eventually produce defective recorded images. In order to avoid these problems, a uniform and comparatively low nip pressure has to be applied to both end portions of the nip roller 78.

If the differential nip pressure creased between the two end portions of the nip roller 80 is at least 300 gf in terms of linear pressure, the light-sensitive material can constantly be biased toward the side having the higher nip pressure. However, if the differential nip pressure is unduly great, the light-sensitive material A can potentially bend or experience other damage along edges in the direction of width depending on its stiffness. On the other hand, if the differential nip pressure is smaller than 300 gf, the light-sensitive material A may meander or weave on account of the clearance between each side of said material and the lateral side of the opposite member of the transport guide 104.

Similarly, a linear pressure of at least 500 gf need be applied as nip pressure to both end portions of the nip roller 80 in order to ensure that the light-sensitive material A can be transported as it is held between said nip roller and the exposure drum. However, a nip pressure exceeding 2,000 gf in terms of linear pressure is so great that not only is there a possibility that the nip roller will cause an adverse effect on the surface to be exposed of the light-sensitive material A but also the effectiveness in biasing the light-sensitive material A toward one side is reduced. If, on the other hand, the nip pressure applied to both end portions of the nip roller 80 is smaller than 500 gf, a slip or other undesired phenomenon can potentially occur between the nip roller 80 and the light-sensitive material, thereby making it impossible to transport the light-sensitive material A with high precision. Thus, the nip roller 80 must be provided at the two end portions with comparatively high nip pressures within the stated range that will provide the stated differential nip pressure.

In the embodiment under consideration, the nip roller 78 is provided at both end portions with a uniform nip pressure which is 90 gf in terms of linear pressure, and the nip roller 80 is provided with a nip pressure of 700 gf at one end portion and a nip pressure of 1,500 gf at the other end portion, both in terms of linear pressure. Under these nip pressure conditions, the nip roller 78 prevents the light-sensitive material A from lifting whereas the nip roller 80 causes the light-sensitive material A to become biased toward the side having the higher nip pressure, whereby the light-sensitive material A can be transported in a steady-state and consistent manner as it runs along only one of the two members of the transport guide 104 located upstream of the exposing section 32.

Therefore, even if the springs that urge the nip rollers 78 and 80 against the exposure drum 76 have their spring constants varied or even if there is a certain clearance between each member of the transport guide and the opposite side of the light-sensitive material A, the lifting of the light-sensitive material A is prevented and, at the same time, it can be transported in a steady-state and consistent manner running along only one of the two members of the transport guide 104 located upstream of the exposing section. As a result, the meandering, skewing, uneven transport and other troubles can be minimized to ensure the recording of high-quality images free from instrumental variability.

Next, the second loop forming portion 70 of the exposing section 32 forms a loop of the light-sensitive material A to thereby accomplish smooth stop of the light-sensitive material A being transported by the transport roller pair 68 in the image position information constructing section 30 and absorb the difference between the transport speeds of the transport roller pair 68 and the exposure drum 76 or the tension created by these members. The second loop forming portion 70 has a transport guide 108 for guiding the light-sensitive material A, a motor 110 for driving the transport guide 108 and a sensor 112 for detecting the formation of a loop of the light-sensitive material A.

The third loop forming portion 74 forms a loop of the light-sensitive material A to thereby accomplish smooth stop of the light-sensitive material A being transported by the transport roller pair 114 and absorb the difference between the transport speeds of the transport roller pair 114 and the exposure drum 76 or the tension created by these members. The third loop forming portion 74 has a sensor 116 for detecting the formation of a loop of the light-sensitive material A, a transport guide 118 for guiding the light-sensitive material A, a motor 120 for driving the transport guide 118, a transport roller pair 114, and a sensor 122 for detecting the advancing end of the light-sensitive material A.

The back printing section 34 is where "back printing" is done by recording various print data on the back side of the print, as exemplified by the date of taking the pictures on the original film and the date of recording on the light-sensitive material A; the back printing section 34 has a printing device 124 and a sensor 126. In the illustrated case, the back printing section 34 performs back printing by thermal transfer using an ink ribbon and, more specifically, frame information is detected with the sensor 126 and the data associated with the print (frame) of interest are back printed with the printing device 124.

As already mentioned, the light-sensitive material A processed in the image recording system 10 is finally cut into finished prints and during its continuous processing starting with exposure and ending with development and subsequent treatments, the light-sensitive material A remains in a web form. It should, however, be noted that the processing speed is not the same in the image recording unit 12 and the developing unit 14 and the processing speed in the image recording unit 12 is generally faster than that in the developing unit 14.

The reservoir 36 is the place where the exposed light-sensitive material A is accommodated and it contributes to an improved processing efficiency by absorbing the difference in processing speed between the developing unit 14 and the image recording unit 12.

Described above is the basic composition of the image recording unit 12.

The developing unit 14 is a wet processor that performs developing and subsequent treatments in accordance with the type of the light-sensitive material A used. If the light-sensitive material A is a silver halide photographic material, the developing unit 14 typically comprises a color developing tank 128, a bleach-fixing tank 130, rinsing tanks 132a, 132b, 132c and 132d, as shown in FIG. 1.

The drying unit 16 dries the exposed and developed light-sensitive material A by any known method.

The ejecting unit 18 cuts the dried light-sensitive material A into individual prints and, if necessary, sorts them in accordance with relevant sort information. To perform these functions, the ejecting unit 18 comprises a cutting section 138 having a sensor 134 for detecting the image position information and a cutter 136 for cutting the light-sensitive material A, and a sorter 140.

The electrical unit 20 will control the above-described image recording unit 12, the developing unit 14, the drying unit 16 and the ejecting unit 18 and, hence, contains the necessary parts such as a control board and a power supply.

Having described the basic composition of the image recording system 10 to which the transport apparatus of the invention for auxiliary scanning, we next describe the operation of the image recording system 10, as well as the operation of the transport apparatus of the invention for auxiliary scanning.

When the magazine of light-sensitive material 38 is loaded in the light-sensitive material supply section 26, the lateral width of each of the transport guides 44, 60 and 66 is adjusted with the motor 46 to become somewhat greater than the width of the light-sensitive material A and the lateral width of the transport guide 104 is similarly adjusted with the motor 105 to become somewhat greater than the width of the light-sensitive material A. Consider a light-sensitive material A having a nominal width of 203 mm which actually measures 202.5 mm on average and 202.8 mm at maximum due to fluctuations. In this case, the lateral width of each of the transport guides 44, 60, 66 and 104 is adjusted to become 204.8 mm by taking an allowance of 1 mm on each side of the light-sensitive material A across its width, which is added to 202.8 mm, or the measured maximal width of the light-sensitive material A.

In the first loop forming section 28, the transport guide 54 is parallel to the longitudinal axis of the drive roller 48. The transport guides 108 and 118 in the second and third loop forming portions 70 and 74 of the exposing section 32 are rotated by motors 110 and 120, respectively, to be oriented normal to the paper, and the nip rollers 78 and 80 in the transport mechanism 72 for auxiliary scanning in the exposing section 32 are spaced from the exposure drum 76.

When the transport guides 44, 60, 66 and 104 have their lateral width determined, the web of light-sensitive material A is drawn out of the magazine 26 by means of the drawing roller pair 40 and, after its papering is detected with the sensor 42, the light-sensitive material A is transported to the first loop forming section 28 as it is guided by the transport guide 44.

In the first loop forming section 28, the light-sensitive material A is transported by means of the drive roller 48 and the guide rollers 50 and 52 as it is guided by the transport guide 54 oriented parallel to the longitudinal axis of the drive roller 48; the light-sensitive material A is further transported to the image position information constructing section 30.

The light-sensitive material A then passes through the transport guide 60 in the image position information constructing section 30 and, after its papering is detected with the sensor 62, the light-sensitive material A passes through the punch 64 and the transport guide 66 and is further transported to the exposing section 32 by means of the transport roller pair 68.

In the exposing section 32, the light-sensitive material A passes through the transport guide 104 in the transport mechanism 72 for auxiliary scanning, i.e., the transport guide shown in FIG. 4, as it is guided by the transport guide 108 in the second loop forming portion 70. If the sensor 106 detects the advancing end of the light-sensitive material A which is passing through the transport guide 104, the lateral width of the latter is set with close tolerance until it becomes substantially equal to the width of the light-sensitive material A by means of the motor 105 as it is transported at a specified speed.

Consider again the case where the light-sensitive material A which has a nominal width of 203 mm actually measures 202.5 mm on average and 202.8 mm at maximum. Since the measured maximal width of the light-sensitive material A still has an allowance of 0.2 mm compared to the nominal width of 203 mm, the lateral width of the transport guide 104 is adjusted to a certain value between the measured maximal width of the light-sensitive material A (202.8 mm) and its nominal width (203 mm), for example, 202.9 mm which is 0.1 mm greater than the measured maximal width but 0.1 mm smaller than the nominal width.

By thusly adjusting the lateral width of the transport guide 104 with close tolerance until it becomes substantially equal to the width of the light-sensitive material A as the latter is transported at a specified speed, one can ensure that the stress during the adjustment of the lateral width of the transport guide 104 by moving its members will not concentrate at a single point on either side of the light-sensitive material A in the direction of width, thereby preventing the light-sensitive material from bending or experiencing certain damage along edges in the direction of width. In addition, the transport path of the light-sensitive material A is corrected to register with a predetermined exposing position immediately before it is brought into the exposing section 32 and this is effective in reducing the meandering of the light-sensitive material A by a sufficient degree to reproduce an undistorted high-quality image.

The light-sensitive material A is further transported by the transport roller pair 68 to pass between the exposure drum 76 and each of the nip rollers 78 and 80. Thereafter, the light-sensitive material A is transported by the transport roller pair 114 as it is guided by the transport guide 118 in the third loop forming portion 74. When the sensor 122 detects the advancing end of the light-sensitive material A being thusly transported, the drive roller 48, the transport roller pair 68, the exposure drum 76 and the transport roller pair 114 stop moving and the light-sensitive material A will accordingly come to rest.

If the sensor 122 detects the advancing end of the light-sensitive material A, the transport guide 54 is rotated by the motor 56 to become detached from the drive roller 48 as shown in FIG. 2. In addition, the transport guides 108 and 118 in the second and third loop forming portions 70 and 74 in the exposing section 32 are rotated by the motors 110 and 120, respectively, to be oriented in a level position (parallel to the paper) and the nip rollers 78 and 80 in the transport mechanism 72 for auxiliary scanning in the exposing section 32 are urged against the exposure drum 76.

Subsequently, the light-sensitive material A is further transported by the drawing roller pair 40, whereupon a first loop of the light-sensitive material A is formed in the first loop forming section 28.

If the sensor 58 detects the formation of the first loop of the light-sensitive material A, namely, if the light-sensitive material A accumulates in the first loop forming section 28 by an amount corresponding to a predetermined number of frames, the drawing roller pair 40 stops moving. Conversely, if the transport roller pair 68 transports the light-sensitive material A until there is no detectable first loop of the light-sensitive material A, the drawing roller pair 40 is driven again to move (see below).

Thus, as long as the sensor 42 detects the papering of the light-sensitive material A, namely, until the magazine 38 becomes empty of the light-sensitive material A, the drawing roller pair 40 keeps moving to ensure that the first loop of the light-sensitive material A is always formed in the first loop forming section 28 by an amount corresponding to the predetermined number of frames.

When the image information to be recorded on the light-sensitive material A is entered after a predetermined length of the light-sensitive material A has accumulated in the first loop forming section 28, the light-sensitive material A is perforated with the punch 64, whereby frame information of a specified shape is formed in the thus specified position. Thereafter, the transport roller pair 68 transports the light-sensitive material A by a distance corresponding to the length of one frame, whereupon the second loop of the light-sensitive material A is formed in the second loop forming portion 70.

After the frame information has been constructed on the light-sensitive material A by means of the punch 64, said light-sensitive material A is transported by the exposure drum 76 in combination with the nip rollers 78 and 80 and when the sensor 112 no longer detects the formation of the second loop of the light-sensitive material A, the transport roller 68 transports the light-sensitive material A by a distance corresponding to one frame length and stops moving thereafter (see below). Thus, as long as the sensor 62 detects the papering of the light-sensitive material A, the punch 64 constructs frame information per frame of the light-sensitive material A and the transport roller pair 68 keeps forming the second loop of the light-sensitive material A in the second loop forming portion 70.

If the sensor 112 detects the formation of the second loop of the light-sensitive material A, namely, if the light-sensitive material A accumulates in the second loop forming portion 70 by an amount corresponding to a predetermined number of frames, the exposure drum 76 taken in combination with the nip rollers 78 and 80 transports the light-sensitive material A such that the sensor 102 detects the frame information constructed on the light-sensitive material A.

These procedures of exposure and transport of the light-sensitive material A are repeated until the sensor 116 detects the formation of the third loop of the light-sensitive material A, i.e., the light-sensitive material A accumulates in the third loop forming portion 74 by an amount corresponding to a predetermined number of frames, whereupon the light-sensitive material A now carrying latent images is transported in frames by the transport roller pair 114 to the back printing section 34. If the relevant frame information is detected by the sensor 126 in the back printing section 34, the printing device 124 back prints the necessary information such as the date of taking the pictures on the film.

After the end of the back printing, the light-sensitive material A is accommodated in the reservoir 36, where it stays for a specified period of time before it is further transported by the transport means to the developing unit 14 (see FIG. 1).

In the developing unit 14, the light-sensitive material A is transported at a predetermined speed to pass through the color developing tank 128, bleach-fixing tank 130 and rinse tanks 132a–132d so that they receive the respective treatments.

The developed light-sensitive material A is then dried in the drying unit 16 and transferred to the cutting section 138 of the ejecting unit 18, where the sensor 134 detects the frame information and the cutter 136 cuts the light-sensitive material A into individual finished prints, which are sorted by the sorter 140 in groups each comprising the number of prints that is determined by the sort information.

The foregoing description concerns the basic operating procedures of the image recording system 10 to which is applied the invention transport apparatus for auxiliary scanning.

While the invention transport apparatus for auxiliary scanning has been described above with reference to the case where it is applied to a digital photoprinter, it should be understood that the applicability of the invention is by no means limited to the illustrated example and that the invention transport apparatus for auxiliary scanning may be used not only with other types of printers but also with conventional image recording apparatus including copiers and printing platemaking machines. Needless to say, the invention transport apparatus for auxiliary scanning with optical beams may be modified or altered in various ways without departing from the scope and spirit of the invention.

As described on the foregoing pages, the invention transport apparatus for auxiliary scanning is so adapted that of the two nip rollers which are urged against the exposure drum, the first nip roller which is located upstream the auxiliary scanning direction and which is used as a guide roller is provided at both end portions with a uniform and comparatively low nip pressure whereas the second nip roller which is located downstream the auxiliary scanning direction and which is used as a transport roller is provided at two end portions with comparatively high nip pressures within a predetermined range that will produce a predetermined differential nip pressure between said two end portions. Therefore, even if the springs that urge the two nip rollers against the exposure drum have errors in their spring constants or even if there is a certain clearance between each member of a transport guide and the opposite side of a light-sensitive material, the differential nip pressure created between the two end portions of the second nip roller will permit the light-sensitive material to be biased toward the side having the higher nip pressure, whereby the light-sensitive material can be transported consistently running along only one of the two members of the transport guide which are locate on opposite ends of the light-sensitive material in the direction of width. As a result, the light-sensitive material is transported in a steady-state and consistent manner and the precision of transport with respect to the exposing position is high enough to ensure the recording of high-quality images free from instrumental variability.

What is claimed is:

1. A transport apparatus for auxiliary scanning which is to be used with an image recording system in which exposing light sources issuing optical beams to be deflected in a main scanning direction are used to scan and expose a web of light-sensitive material, said apparatus having an exposure drum that transports said web of light-sensitive material in a auxiliary scanning direction which is substantially perpendicular to said main scanning direction as it is held in a predetermined exposing position, as well as a first and a second nip roller that are spaced apart in said auxiliary scanning direction, with said exposing position lying in between, and which urge said web of light-sensitive material against said exposure drum, said first nip roller being located upstream said auxiliary scanning direction and provided with a uniform predetermined nip pressure at both end portions, and said second nip roller being located downstream said auxiliary scanning direction and provided at opposite end portions with nip pressures within a predetermined range that will create a predetermined differential nip pressure between said opposite end portions.

2. An apparatus according to claim 1, wherein the nip pressure applied to both end portions of said first nip roller is no more than 200 gf of linear pressure whereas the differential nip pressure created between opposite end portions of said second nip roller is at least 300 gf of linear pressure and the nip pressures applied to said second nip roller are within the range from 500 gf to 2,000 gf of linear pressure.

* * * * *